United States Patent
Caulkins (10) Patent No.: US 9,384,137 B2
(45) Date of Patent: Jul. 5, 2016

(54) PROGRESSIVE PRE-CACHING

(71) Applicant: Jason Caulkins, Issaquah, WA (US)

(72) Inventor: Jason Caulkins, Issaquah, WA (US)

(73) Assignee: DATARAM, Inc., Bellevue, WA (US)

( * ) Notice: Subject to any disclaimer, the term of this patent is extended or adjusted under 35 U.S.C. 154(b) by 118 days.

(21) Appl. No.: 14/489,927

(22) Filed: Sep. 18, 2014

(65) Prior Publication Data

US 2015/0242325 A1 Aug. 27, 2015

Related U.S. Application Data

(63) Continuation-in-part of application No. 14/188,304, filed on Feb. 24, 2014, now Pat. No. 9,250,762.

(51) Int. Cl.
*G06F 12/00* (2006.01)
*G06F 12/08* (2016.01)
*G06F 12/12* (2016.01)

(52) U.S. Cl.
CPC ........ *G06F 12/0862* (2013.01); *G06F 12/0871* (2013.01); *G06F 12/12* (2013.01); *G06F 2212/1016* (2013.01); *G06F 2212/2515* (2013.01); *G06F 2212/305* (2013.01); *G06F 2212/601* (2013.01); *G06F 2212/7201* (2013.01)

(58) Field of Classification Search
CPC ............ G06F 12/0862; G06F 12/0833; G06F 2212/62; G06F 2212/6022; G11C 7/1072
See application file for complete search history.

*Primary Examiner* — Gurtej Bansal
(74) *Attorney, Agent, or Firm* — Donald R. Boys; Central Coast Patent Agency, Inc.

(57) ABSTRACT

A system includes a computerized appliance connected to a network, a processor, a persistent memory, a dynamic random access memory, and software executing on the processor, the software provides for installing an application, storing data to be used in execution of the application, mapping logical block addresses at which particular data is stored to data in an order of expected use, the data-use profile listing an expected order of data use in execution of the application, configuring the DRAM with a cache of a specific data capacity, transferring a block of data equal to the cache size into the cache according to the order of data in the data-use profile, and as data is used in execution of the application, emptying used data from the cache and transferring not-yet-used data from persistent storage into the cache according to the order of data in the data-use profile.

14 Claims, 10 Drawing Sheets

PROGRESSIVE PRE-CACHING

CROSS-REFERENCE TO RELATED DOCUMENTS

The present application is a continuation-in-part of U.S. Ser. No. 14/188,304 filed on Feb. 24, 2014, and entitled "Deterministic Pre-Caching". All disclosure of the parent application is incorporated at least by reference.

BACKGROUND OF THE INVENTION

1. Field of the Invention

The present invention is in the field of general-purpose computers, and pertains particularly to pre-caching data to DRAM memory for specific applications.

2. Discussion of the State of the Art

Computer systems typically have data storage systems from which data is read and to which data is written during program execution. Permanent storage is typically accomplished via a disk drive or other persistent media. Computers also typically have Dynamic Random Access Memory (DRAM), which is volatile memory, meaning that the contents are lost when power is switched off. It is well known that read and write data access is generally slower with persistent media than with DRAM. Because of this, computers in the art often temporarily hold some data in DRAM for quicker access by the central processing unit (CPU). Loading this data prior to the time when it needs to be accessed is called pre-caching.

For optimal performance, computer programs and applications need to access most urgent and frequently used data as quickly as possible. The system will typically learn to cache, making that data more readily available. Still, the machine learning takes time, and does not always produce the optimum performance, especially in the case of certain applications which may need to access large amounts of infrequently-used data. Therefore, what is clearly needed is a method to enable the computer to configure DRAM to have a cache portion, and to cache data in a manner to optimize performance for data-intensive programs that are important, but are not necessarily cache-friendly.

BRIEF SUMMARY OF THE INVENTION

In one embodiment of the invention a system is provided comprising a first computerized appliance having connection to a network, a processor, at least one persistent memory data repository coupled thereto, a dynamic random access memory (DRAM), and software (SW) executing on the processor from a non-transitory medium, the SW providing a process of installing an application for which data caching is desired, storing data to be used in execution of the application at available persistent storage block addresses, mapping logical block addresses at which particular data is stored to data in an order of expected use according to a data-use profile accessible to the installation process, the data-use profile listing an expected order of data use in execution of the application, configuring the DRAM with a cache of a specific data capacity, transferring a block of data equal to the cache size into the cache according to the order of data in the data-use profile, and as data is used in execution of the application, emptying used data from the cache and transferring not-yet-used data from persistent storage into the cache according to the order of data in the data-use profile.

In one embodiment of the system the data use profile is developed by tracking data use by one or more computerized appliances in execution of the application. Also in one embodiment the data-use profile is developed in cooperation with a vendor of the application. Also in one embodiment data transfer into the cache is block-by-block in the order of the data-use profile as used data is evicted from the cache. Still in one embodiment data transfer into the cache is periodic and determined by pre-determined time or data size. In yet another embodiment data called in execution that is not found in the cache is read from persistent storage. And in one embodiment actual data use in execution of the application is tracked and compared to the data-use profile, and wherein periodic correction to the data-use profile is made accordingly.

In another aspect of the invention a method is provided comprising installing an application for which data caching is desired in persistent memory of a first computerized appliance having connection to a network, a processor, at least one persistent memory data repository coupled thereto, a dynamic random access memory (DRAM), and software (SW) executing on the processor from a non-transitory medium, storing data to be used in execution of the application at available persistent storage block addresses, mapping logical block addresses at which particular data is stored to data in an order of expected use according to a data-use profile accessible to the installation process, the data-use profile listing an expected order of data use in execution of the application, configuring the DRAM with a cache of a specific data capacity, transferring a block of data equal to the cache size into the cache according to the order of data in the data-use profile, and as data is used in execution of the application, emptying used data from the cache and transferring not-yet-used data from persistent storage into the cache according to the order of data in the data-use profile.

In one embodiment of the method the data use profile is developed by tracking data use by one or more computerized appliances in execution of the application. Also in one embodiment the data-use profile is developed in cooperation with a vendor of the application. Also in one embodiment data transfer into the cache is block-by-block in the order of the data-use profile as used data is evicted from the cache. Still in one embodiment data transfer into the cache is periodic and determined by pre-determined time or data size. In another embodiment data called in execution that is not found in the cache is read from persistent storage. And in one embodiment actual data use in execution of the application is tracked and compared to the data-use profile, and wherein periodic correction to the data-use profile is made accordingly.

DETAILED DESCRIPTION OF THE INVENTION

In various embodiments described in enabling detail herein, the inventor provides a system for progressive pre-caching of data for an application running on a computerized appliance. The present invention is described using the following examples, which may describe more than one relevant embodiment falling within the scope of the invention.

Figure 1:
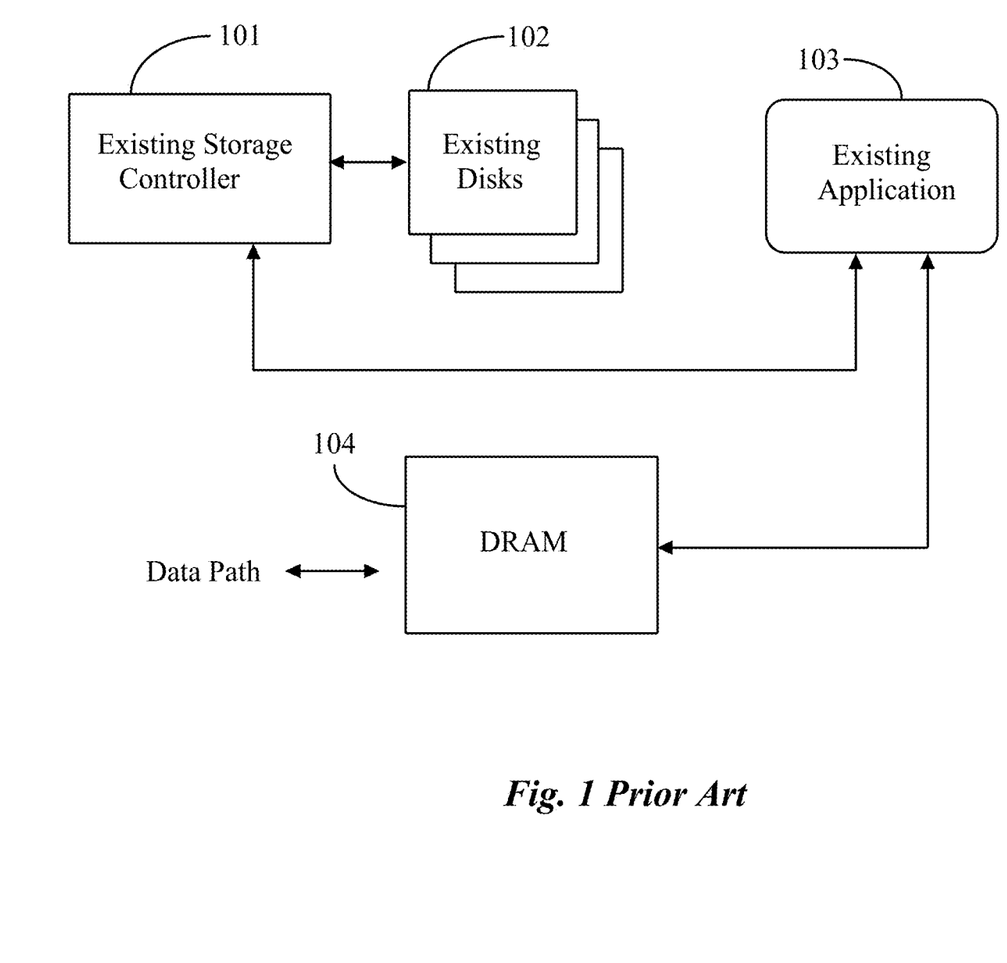
FIG. 1 is an architectural illustration of a typical prior art computer system showing data paths.

FIG. 1 is an architectural illustration of a typical prior art computer system showing data paths. In the prior art, application 103 executing on the CPU (not shown) of the computer receives data from disks 102 or other persistent storage through existing storage controller 101. Application 103 can also be served data from DRAM 104, if needed data is in fact stored in the DRAM. If the application is infrequently used and uses large amounts of data, typical DRAM will not make much difference in the storage performance of the application. The system will typically 'learn' to cache, making needed data more readily available. Still, the machine learning takes time, and does not always produce the optimum performance, especially in the case of certain applications which may need to use large amounts of infrequently-used data. In the existing art illustrated by FIG. 1 there is no facility for a user to select programs for pre-cache optimization.

Figure 2:
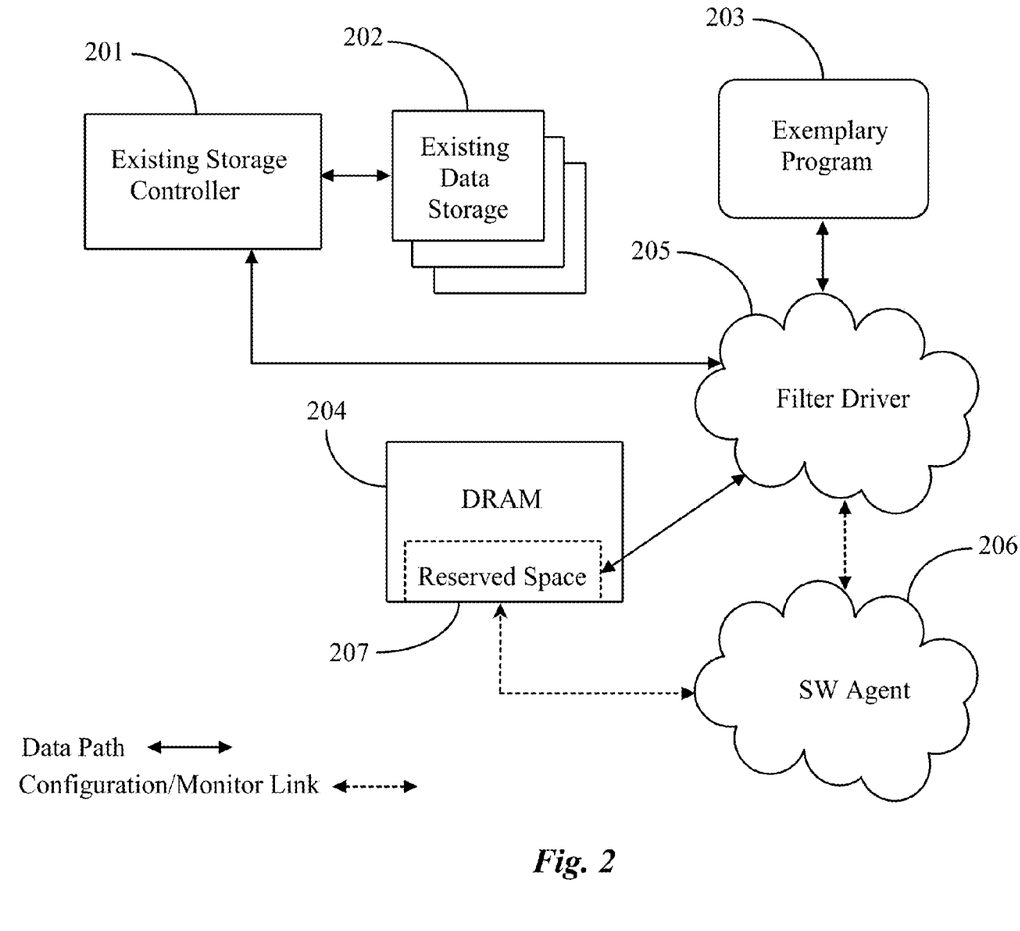
FIG. 2 is an architectural illustration of a computer system utilizing cache optimization according to an embodiment of the present invention.

FIG. 2 is an architectural illustration of a computer system utilizing deterministic pre-caching optimization according to an embodiment of the present invention to optimize performance of an example program 203 running on the computer CPU (not shown). In one embodiment a user obtains and installs deterministic pre-caching software (SW) which includes a filter driver 205 and a SW agent 206. The pre-caching SW may be downloaded from a website, or may be provided in another manner, such as on a portable memory device or disk.

Once installed, the pre-caching SW loads and runs in the background when the computer is booted. The first time the SW executes SW, Agent 206 initiates a scan of all persistent storage 202 coupled to the computer, through existing storage controller 201, to find executable application files. On completion of the scan SW Agent 206 populates and displays a list of the executable application files found in a GUI window as shown for example in FIG. 3. The GUI window is enabled with interactive indicia enabling the user to accomplish a number of objectives such as choosing applications to be optimized, selecting the priority of optimization of individual or groups of applications and selecting the amount of DRAM memory 207 to allocate as cache for individual or groups of applications.

Figure 3:
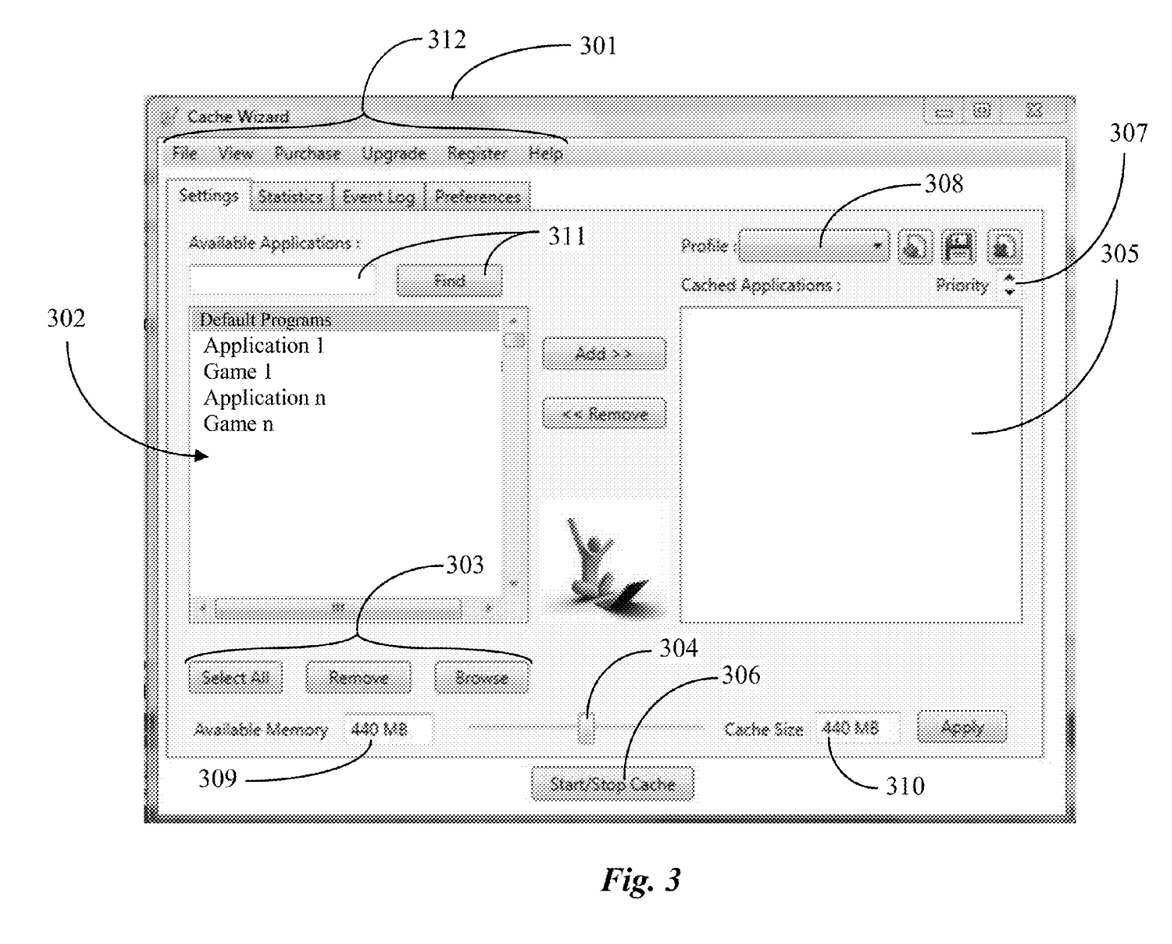
FIG. 3 is an exemplary screen shot of a Graphical User Interface according to an embodiment of the present invention.

FIG. 3 is an exemplary screen shot of a Graphical User Interface according to an embodiment of the invention. In using the deterministic pre-caching SW of an embodiment of the invention a graphical user interface 301 is provided. The user may search for an application for optimization with provided search window 311. The user may also browse for applications through the browse button in selector group 303. The selectors in group 303 also enable selecting all programs and removing programs prior to adding to window 305. In one embodiment the indicia include an available memory indicator 309, a cache size selector 304, a cache size indicator 310 and a start stop indicator 306.

As a result of the scan of persistent storage 202 a list of executable programs is rendered in window 302. These programs may be selected by the user and added to window 305 one at a time or in groups. Once added to window 305 the user may prioritize the programs by selecting a program and using arrow selector 307 to raise or lower the priority of the program. The priority of the programs may be made individually or in groups. The user has the ability to select the cache size in DRAM for particular programs or groups of programs via selector 304 which may be moved to the left or right, raising or lowering the amount of cache used for each program.

On first execution of one of the configured programs optimized by the user with interactive interface 301, filter driver 205 receives notice from Agent 206 that the application is launching. As the program operates, Filter driver 205 monitors data traffic and builds a table of Logical Block Addresses (LBAs) to cache for this program. The table of LBAs associated with this program is saved if the program is terminated, and the cached data for that program remains in cache in DRAM while the computer is in operation. If the same program is called again before the computer is shut down, in one embodiment of the invention the SW again tracks data usage, and if that usage differs significantly, the LBA table for that program may be updated.

When and if monitored applications are quit or the computer is shut down, LBA tables built and possibly refined during operation are saved for later use, and in the case of a reboot, any data cached in DRAM 204 disappears from the DRAM. At subsequent computer boot as programs are called and begin to execute, Filter Driver 205 manages data caching for the programs, enabling optimized performance of the programs.

In one embodiment a profile may be selected via drop-down menu 308 of FIG. 3, which may contain an application or a group of applications that a user has previously set up for deterministic pre-caching. A user may have a profile for gaming, for example, whereby certain gaming applications are configured for deterministic pre-caching. Another user or the same user may have a pre-configured group of applications concerning graphics that he or she has pre-configured to use deterministic pre-caching software according to an embodiment of the present invention. In one embodiment the GUI may include a group of links 312 that enable the user to purchase software, upgrade software, register software or get help with software.

Figure 4:
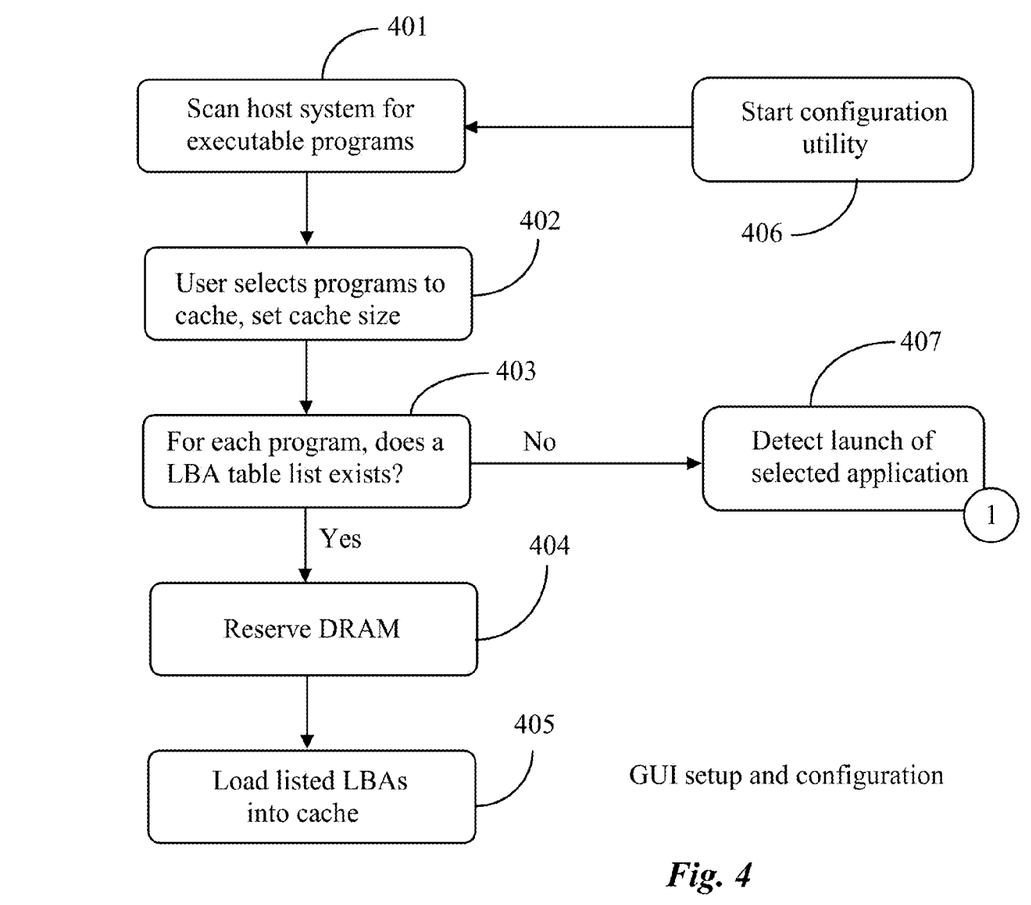
FIG. 4 is a process flow chart illustrating configuration of a computer for program optimization, using a GUI interface according to an embodiment of the present invention.

FIG. 4 is a process flow chart illustrating configuration and setup using the GUI interface of FIG. 3 according to an embodiment of the present invention. In one embodiment a configuration utility is initiated at step 406. Once the configuration utility is initiated the system initiates a scan of the host system at step 401 to find executable programs. The executable programs are listed in interface 302 of FIG. 3. At step 402 the user selects programs among the listed programs to cache and selects the cache size. The system determines in step 403 if a LBA table exists for the selected program. If so, then a portion of DRAM is reserved at step 404. At step 405 the data at the LBAs from the table are loaded into the reserved DRAM cache. If at step 403 it is determined that an LBA table does not exist, then control goes to step 407 to continue to look for launch of a selected application.

Figure 5:
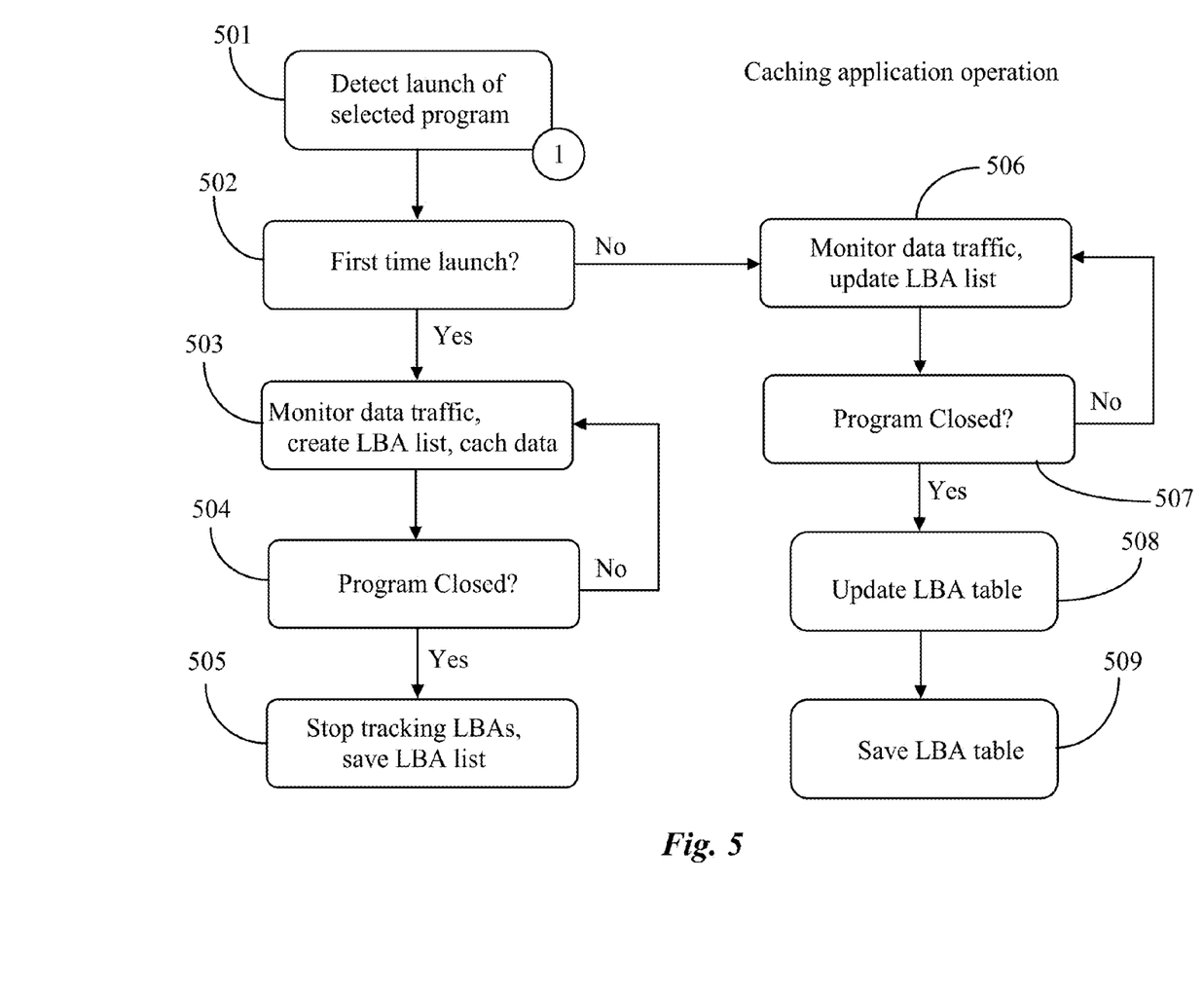
FIG. 5 is a process flow chart illustrating a caching application operation following launch of a program in an embodiment of the invention.

FIG. 5 is a process flow chart illustrating a caching operation according to an embodiment of the present invention, expanding from position (1) in FIG. 4, showing operation when a selected program is launched. In this embodiment, at step 501, a launch of the selected program is detected. At step 502 it is determined if the launch is a first launch. If at step 502 it is determined that the launch of the program is a first launch, then at step 503 the data traffic is monitored, cached, and an LBA table is created. At step 504 a determination is made as to whether the program has been closed or not. If the program is closed at step 504 then the LBA is saved at step 505. If it is determined that the application has not been closed at step 504 then step 503 continues to monitor LBA traffic for the closure of the application so that an LBA table may be created and data cached.

If at step 502, the launch of the program is not a first launch, the data traffic is monitored and the LBA table is updated at step 506. At step 507 a determination is made as to whether the application has been closed. If the application has been closed, then at step 508, unused addresses are removed from the LBA table and LBAs that were accessed that were not on the table are added to the table, then the LBA table is saved at step 509. If it is determined that the program has not been closed at step 507 the data traffic continues to be monitored at step 506 until the program is closed and the LBA table can be updated and saved at step 508 and 509.

Figure 6:
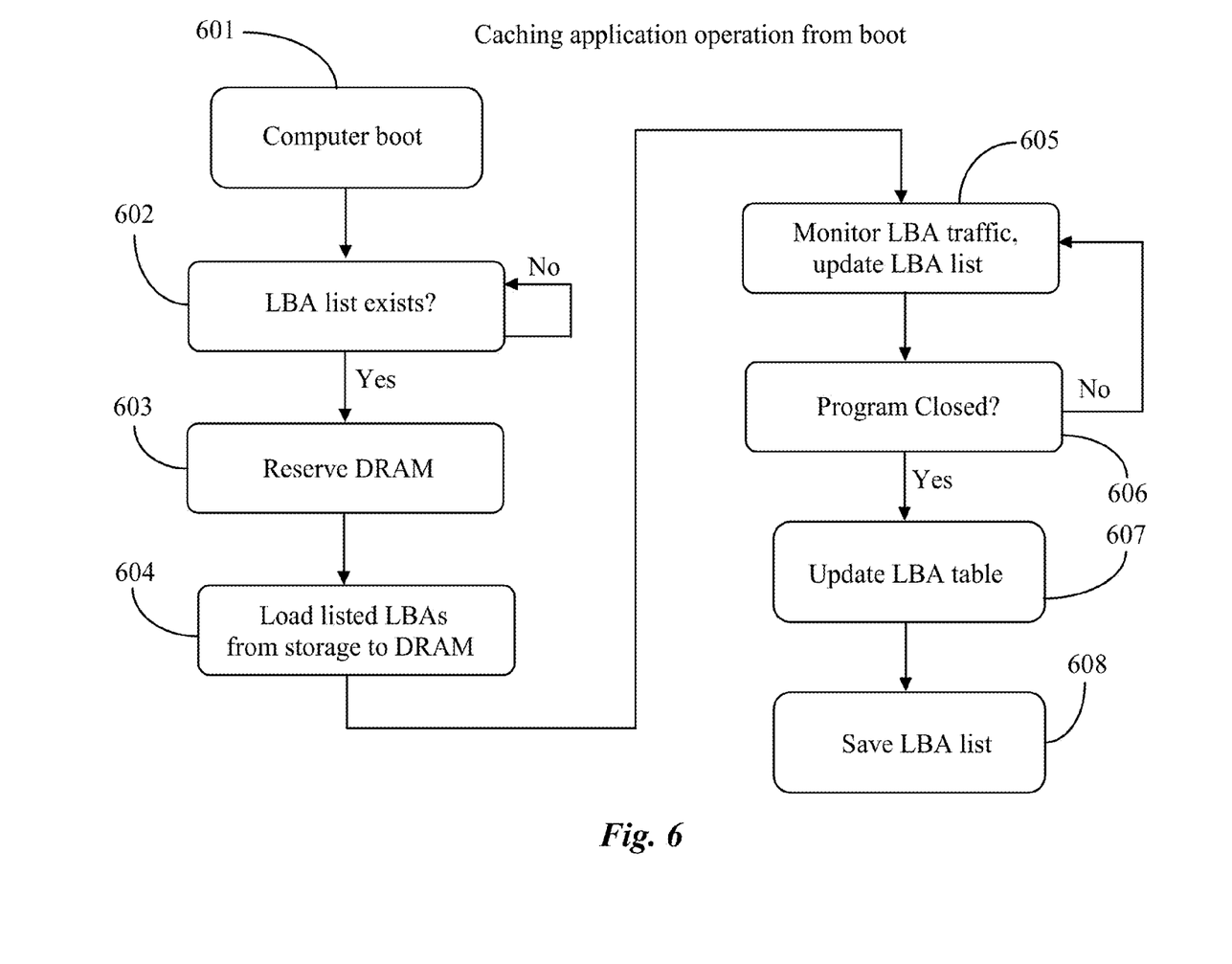
FIG. 6 is invention process flow chart illustrating a caching operation following computer boot in an embodiment of the present invention.

FIG. 6 is a process flow chart illustrating a caching operation from computer boot according to an embodiment of the present invention. At step 601, the computer is booted. Once the computer is booted a determination is made as to the existence of the LBA list previously created. If the LBA list is detected at step 602, DRAM is reserved at step 603. At step 604 the data from the listed LBAs is loaded from storage to DRAM. At step 605 the data traffic is monitored and LBA lists are updated. If the program is closed at step 606 the unused LBAs are removed, LBAs not listed on the table are added, and the LBA table is updated. If the application is not closed at step 606 the data traffic continues to be monitored and updated until the application is closed and the LBA table is updated in step 607 and saved in step 608.

In one embodiment the pre-caching SW of the invention may run in the background with no need for user input. In another embodiment the configuration utility is pre-configured with common LBA profiles for applications such that little or no user input is needed. In this embodiment there may be a utility for noting the directory structure of a user's computer, and processing that structure to determine data storage characteristics enabling LBA lists pre-prepared for known programs to be downloaded and used without user input.

An internet-connected server may be provided comprising software executing from a non-transitory medium, and a range of functionality including, for example, downloading deterministic pre-caching software according to embodiments of the present invention. This server also provides services that may be accessed manually or automatically. In the embodiment illustrated in FIG. 3 access is by drop-down menus. The software comprising a configuration utility executable on a CPU of a computing appliance, and a stored database comprising information and files associated with programs, the information and files prepared to optimize performance of specific programs in caching operation. The server provides an interactive interface to a browser executing on an Internet connected computing appliance, the interactive interface enabling a user to download the software, to be installed and executed on the CPU of the computing appliance, downloading configuration files to be installed on the computing appliance, partitioning a portion of system DRAM of the computing appliance as cache, and loading information and files from the storage media to the cache portion of system DRAM, optimizing performance of the programs installed on the computing appliance.

Progressive Pre-Caching of Data

It has occurred to the inventor that the system described above with regard to FIGS. 2 through 6 is somewhat limited in that it captures only the initial launch LBA data up to the size reserved for that application in the DRAM cache. More importantly, the process stops after an application is loaded and the cache data has been used during the load process. The cache is no longer needed after the load, since applications only launch once during a session. This unneeded data can be evicted from the cache, and the next most likely to be used data can be loaded into the freed-up space.

It has also occurred to the inventors that more streamlining in cache operation for selected applications is possible through process customization. There exists a class of applications, such as large video games, that use a great deal of data. Since DRAM in any particular platform is limited, dedicating enough data space to cache all or most of the data for such applications is problematic. But the inventor has observed that the order in which the large amount of data is used for a particular application is generally the same, regardless of the user's platform. Therefore the inventor provides in another embodiment a system for progressive pre-caching of data for such applications.

Figure 7:
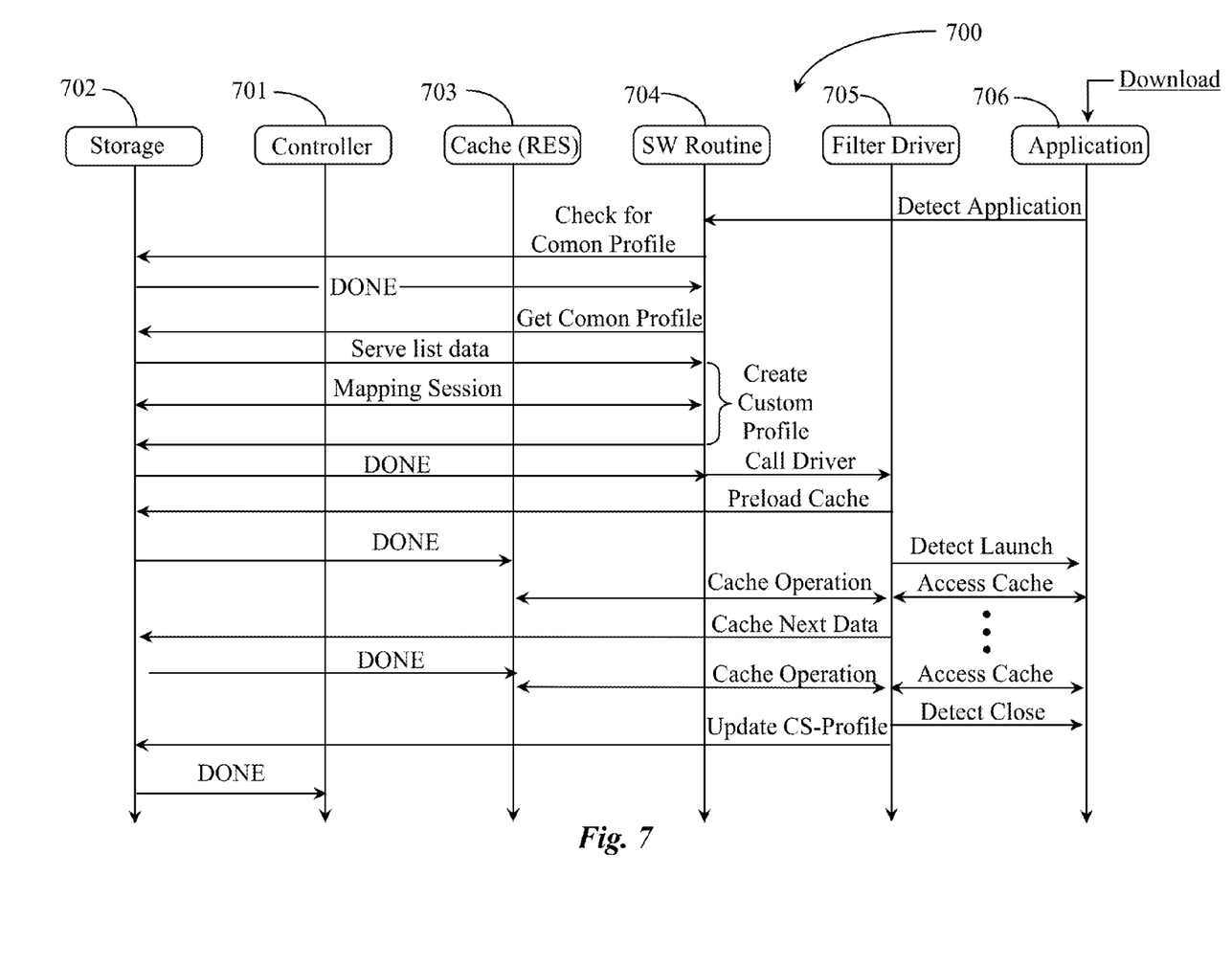
FIG. 7 is a sequence diagram depicting interaction between basic components involved in progressive data pre-caching according to an embodiment of the present invention.

FIG. 7 is a sequence diagram 700 depicting interaction between basic components involved in progressive data pre-caching according to an embodiment of the present invention. The basic components are represented by blocks at the top of the diagram and include from left to right, a data storage 702, a controller 701, a cache 703 (typically a portion of DRAM), software routine 704, a filter driver 705, and an application 706 for which caching is to be accomplished.

Storage controller 701 as well as all of the other components in this example is analogous to components 201 through 206 depicted in FIG. 2 of this specification. Reserved memory analogous to reserved space 207 of FIG. 2 is not depicted on cache memory 703 in this example, but may be assumed present in this embodiment. In this example, a user operating a computing appliance hosting components 701 through 705 may download and install a software application 706 that has been or may be pre-selected for data pre-caching according to one or more embodiments of the present invention.

In this embodiment the application 706, which may be a video game or other application using large amounts of data, is downloaded (arrow Download) and installed on the user's computing appliance along with a common data storage profile for the application. A common data storage profile for the application represents the most common data use profile order for the application. A common storage profile in this example is a list of data files that represents the order that data will be called during execution by any user. Such a data order profile is generated in one embodiment from data aggregated from multiple users interacting with the application. A common data storage profile for an application may be created by monitoring a relatively large group of users interacting with the application and identifying the data called during run time and giving priority to data that has been called at a higher percentage rate relative to all of the users among the group. Such a profile may be created in cooperation with a vendor of a video game, for example, or may be created by an enterprise providing the data-caching program of the instant invention.

Computing appliances, as is well-known, may vary considerably in operating systems, storage capacity, and computing power amongst multiple users. Furthermore, physical storage format (LBA locations of application related data) will also differ among the appliances operated by different users.

In this example, a common data storage profile for the application is provided with the application download and is available to the user's installed caching software. On installation, the common storage profile may be stored in data storage 702 associated with or otherwise mapped to the installed application. Filter driver 705 manages data caching for the application. SW routine 704 represents the software of the present invention stored on the user's computing appliance. The application for which data is to be cached may be recognized by the filter driver 705, which may function as a proxy between the application and storage controller 701.

In one embodiment, upon installation or during the installation process, the installer on the computing appliance or downloaded with the application (installer not depicted) calls filter driver 705. Filter driver 705 may store the common profile associated with the application data by leveraging services of storage controller 701. Controller 701 stores the profile and notifies, in this embodiment, software routine 704. Routine 704 may, after installation and registration of the application, call storage controller 701 and request access to the common storage profile that came with the application. The controller causes service of the data from data storage 702. The data is in list form and represents the most common application data used during application launch and continued operation.

In one embodiment the data includes all of the code required for application function plus the most common variable data selected or called by users of the application in testing as described further above. SW routine 704 begins a process of customizing the common storage profile to the user's specific data storage arrangement where the data is stored in data blocks having local block addresses (LBAs) on the user's computing appliance storage device.

During a mapping session the generic data address list is read and the unique data address list is created based on the application data stored on the user's appliance. In one embodiment, this process only happens once after installation. In another embodiment the process may repeat for applications that continue one or more setup procedures after initial installation, such as upon application update to further configure and store data. The custom storage profile includes all of the data files that comprise the application data listed in the common profile list.

SW routine 704 calls the storage controller and requests storage of the data listed in the profile. The controller stores the data according to available storage addresses and blocks in the user's persistent storage. The data stored in the installation is all of the data that will be used in executing the application for which data is cached. The controller confirms data storage and the SW routine may notify filter driver 705 of the completion of the mapping process.

Each user's platform at the time of installation has a specific DRAM available, and the cache size is determined at least in part by the overall DRAM size and how much may be occupied by other programs. When the user launches the application after installation and cache configuration, filter driver 705 may call the custom storage profile for the installed application 706 and may preload cache 703 with the first LBAs in the list up to the amount of memory that has been made available for the cache for the application.

Upon request from filter driver 705, storage controller 701 preloads cache 703 with the application data. In one embodiment the process of preloading the cache with the application data is performed after every boot of the user's appliance. In one embodiment the process of creating a custom storage profile and preloading the cache with the initial data happens automatically upon download and install of the application whether the application is designed to self-execute upon download and install or whether the user must manually install the application.

Filter driver 705 may continuously monitor for execution of the application on the personal computing appliance of the user and may detect launch of application 706, in this case first time execution of the application. The application accesses reserved cache memory directly through filter driver 705 for the preloaded data bypassing storage controller 701. The cache operation results in service of the sequential data LBA by LBA from cache to the application. As the data is used by the application, the read data may be evicted from the cache and the next block of data according to the custom profile list created during the mapping process may be loaded into the newly-available cache space. Alternatively the system may wait until a predetermined portion of the cache is emptied, or even until all of the cache is free before loading next blocks according to the profile.

It will be apparent to one with skill in the art that the process (repeated cache operations) is ongoing while the application is running unless it is idling or in sleep mode or is otherwise open but not active. At each operation, the next data preloaded into cache represents the data the user will most probably require based on the statistics associated with the testing of the application and development of the common profile. However, that does not guarantee the user will be able to use the cached data in every preloaded data block. In the case that the application requires data that has not been preloaded into cache, the filter driver gets the data from persistent storage through the connection with the storage controller.

In a preferred embodiment the filter driver captures what data is actually called during the session with the application documenting the actual data list as called compared to the data list in the custom profile. If user data is repeatedly called from persistent storage that is not listed in the custom profile for the application, the LBAs containing that data might be added to the list, replacing data previously occupying that position in the custom list.

Filter driver 705 may detect closing of application 706. Filter driver 705 may then request update for the custom storage profile. Storage controller 701 may then update the custom storage profile. In one embodiment filter driver 705 may request updates to the custom profile before closing the application, such as periodically during the life of the application session. In this way computer failure or power failure would not result in significant loss of any data.

In an example where the system may update the custom profile, consider a video game where during first session play in testing for common profile users select a particular game piece or accessory or passage way at a higher percentage rate precluding loading of that data into the cache according to the custom profile during play on the user's appliance. The user may prefer some other game piece, accessory, or passageway at a rate as high or higher than the testing ratio for the cached data. The system may learn preferences of the user and modify the custom data storage profile for the application.

Figure 8:
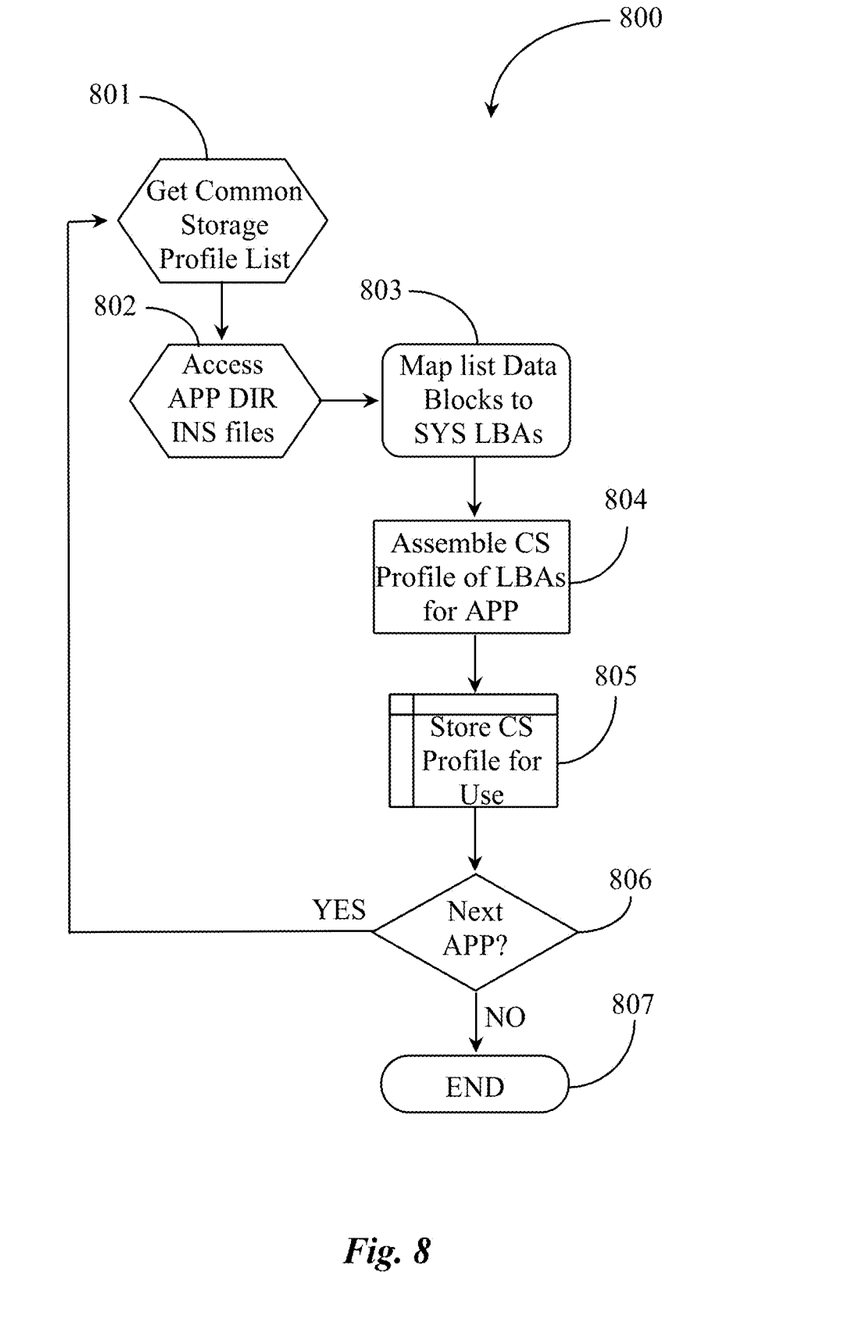
FIG. 8 is a process flow chart depicting steps for mapping data sets specific to a software application to local block addresses specific to a user's data storage profile on a particular computing appliance.

FIG. 8 is a process flow chart 800 depicting steps for mapping data sets specific to a software application to local block addresses specific to a user's data storage profile on a particular computing appliance. In step 801 the SW routine analogous to routine 704 of FIG. 7 gains access to a common storage profile list for an application that has been selected by the user for caching according to an embodiment of the present invention. Access to the common profile may be provided through a data storage controller or obtained from a remote server. The profile may contain the most common data called during runtime based on accounts of multiple users grouped together to test the application, as described above.

In step 802, the system accesses the application directory and installation files noting the local block addresses for the data in persistent storage. In step 803 the routine maps the data in the common profile to the data in persistent storage to determine the LBAs containing the data. In step 804 the system assembles or otherwise generates a custom data storage profile of LBAs for the application. The custom profile provides a list of LBAs containing the actual application data listed in the common profile. The LBA list is serially ordered in a fashion based on the order of the data listed in the common profile.

Once the custom storage profile is created the system may store it for later use at step 805. The process may then be complete for that application. A custom storage profile provides the caching SW with the list of LBAs containing the data to be pre-cached. At step 806, it may be determined if there is another application waiting for the mapping process. If it is determined that another application with a common profile needs mapping, then the process may loop back to step 801 where the system gets the common storage profile for the next application slated for data pre-caching. If there is no other application listed for mapping the process ends at step 807. The system essentially uses the common profile as a template to locate the actual LBAs containing the data for pre-caching.

Figure 9:
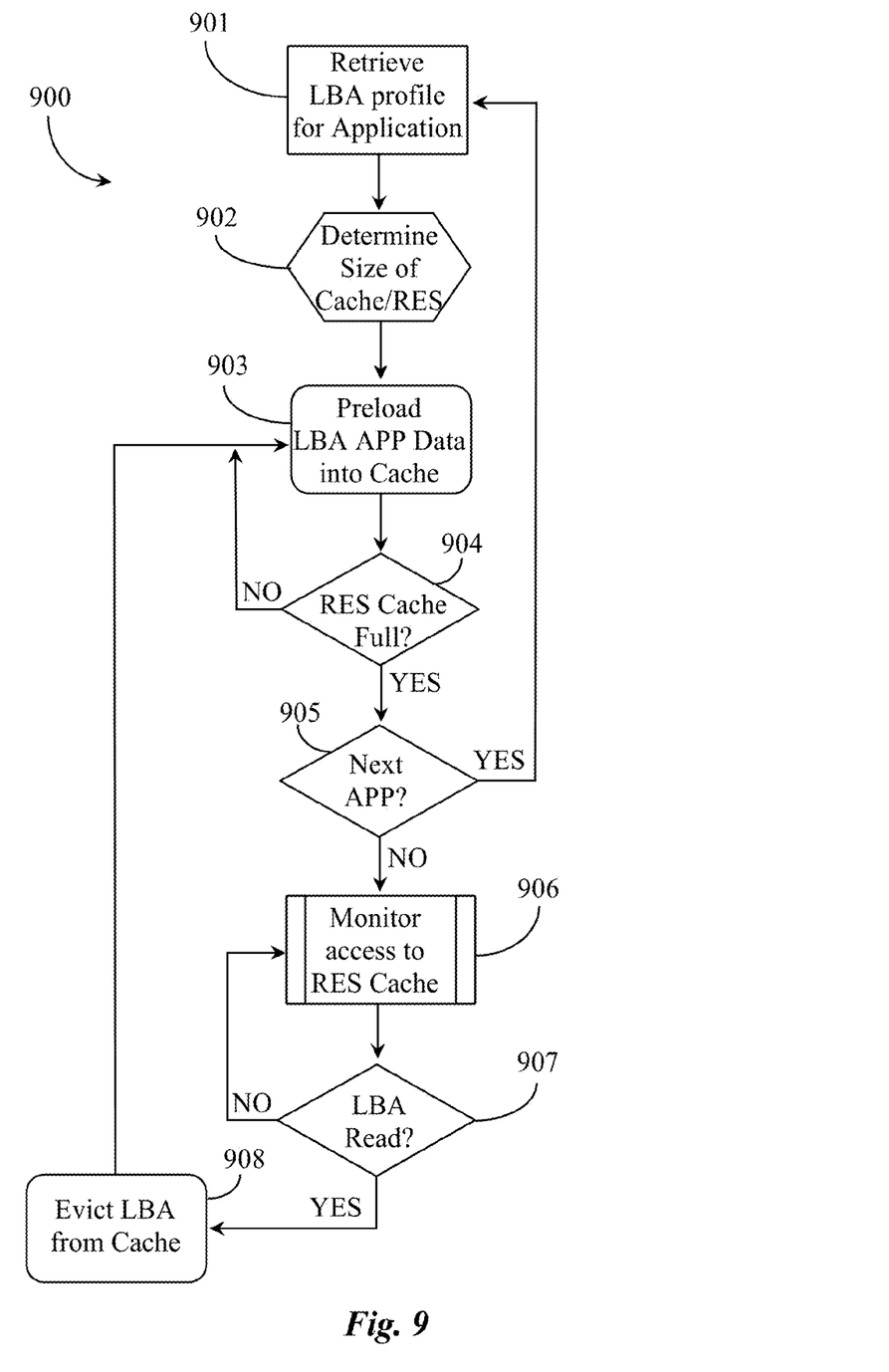
FIG. 9 is a process flow chart depicting steps for pre-caching of application data and maintaining data caching for a running application.

FIG. 9 is a process flow chart 900 depicting steps for pre-caching of application data and maintaining data caching for at least one application. It is assumed in this process that at least one application is installed and ready to execute on a user's computing appliance and has an LBA profile stored for that application. At step 901 the system retrieves the LBA profile for an application. An LBA profile refers to a custom data storage profile that includes identification and order of the LBAs for the application files and data in persistent storage.

At step 902, the system may determine the size of cache memory for the running application. In one embodiment a user operating a user interface analogous to interface 301 described with reference to FIG. 3 above may accomplish this. In another embodiment the system may perform the operation any time before pre-caching actually begins for the application. The actual size of the amount of cache allotted for pre-caching of data for a specific application may depend in part on the type of application, for example video game vs. word processing application, or on a priority of the application relative to other running applications on the user's computing appliance. In one embodiment a user may set the size of reserved cache memory for an application while in other embodiments the system may set reserved cache size.

In step 903 the system preloads LBA data from persistent storage into the cache memory reserved for that application. In one embodiment preloading may continue until the system determines if the reserved cache limit is reached for that application. If the cache limit is reached at step 904 for that application, the process may be finished for that application. If it is determined that cache limit has not been reached for that application in step 904 the process may loop back to step 903 until the reserved cache for that application is full.

At step 905 the system determines if there is another application installed that needs preloading into cache. If there is another or next application to preload at step 905, the process may loop back to step 901 where the system obtains the LBA profile for that application. At step 906 the system (filter driver) monitors application access of reserved cache memory that is preloaded with data for that application. In one embodiment more than one instance of driver is activated for more than one application running and accessing cache memory to read preloaded data.

For each accessing application the system determines if a block of data preloaded into cache has been read by the accessing application. If it is determined that no data has been accessed by an application the process loops back to step 906 where monitoring continues for each application having preloaded data in cache memory that has been reserved specifically for that application. If it is determined that at minimum a block of data has been read at step 907 then the system (filter driver) may evict the block of data from cache in step 908. The process may resolve to step 903 where the driver may preload the next LBA block of data from persistent storage into the reserved cache. The process loop may continue as long as the application is running. Step 907 may operate block-by-block, or may have a time or data size limitation for eviction and reloading the cache.

In one embodiment the reserved cache memory for a specific application is periodically preloaded with data during application runtime such as at every read of x blocks of data. In the event that the application requests data that is not preloaded in cache reserved for that application, the filter driver may obtain the data from persistent storage through the storage controller. The filter driver may keep record of the data blocks accessed from persistent storage so that the custom storage profile list may be modified by adding LBA data if deemed statistically prudent by processing logic.

As the cache is accessed, data is evicted from cache and the next block data in the custom block list may be loaded in its place, according to a pre-determined plan. Pre-loading of the cache can be done as a best-effort background task such that performance of the primary application (game) is minimally impacted. If the filter driver falls behind storage requests, or there is a cache miss, requested data may be read from the original storage source on the user's computing appliance and or connected peripheral (remote storage) at whatever speeds that device and network supports. If there is pre-cached data that according to the custom profile will no longer be needed it may be evicted even if it was not accessed.

Figure 10:
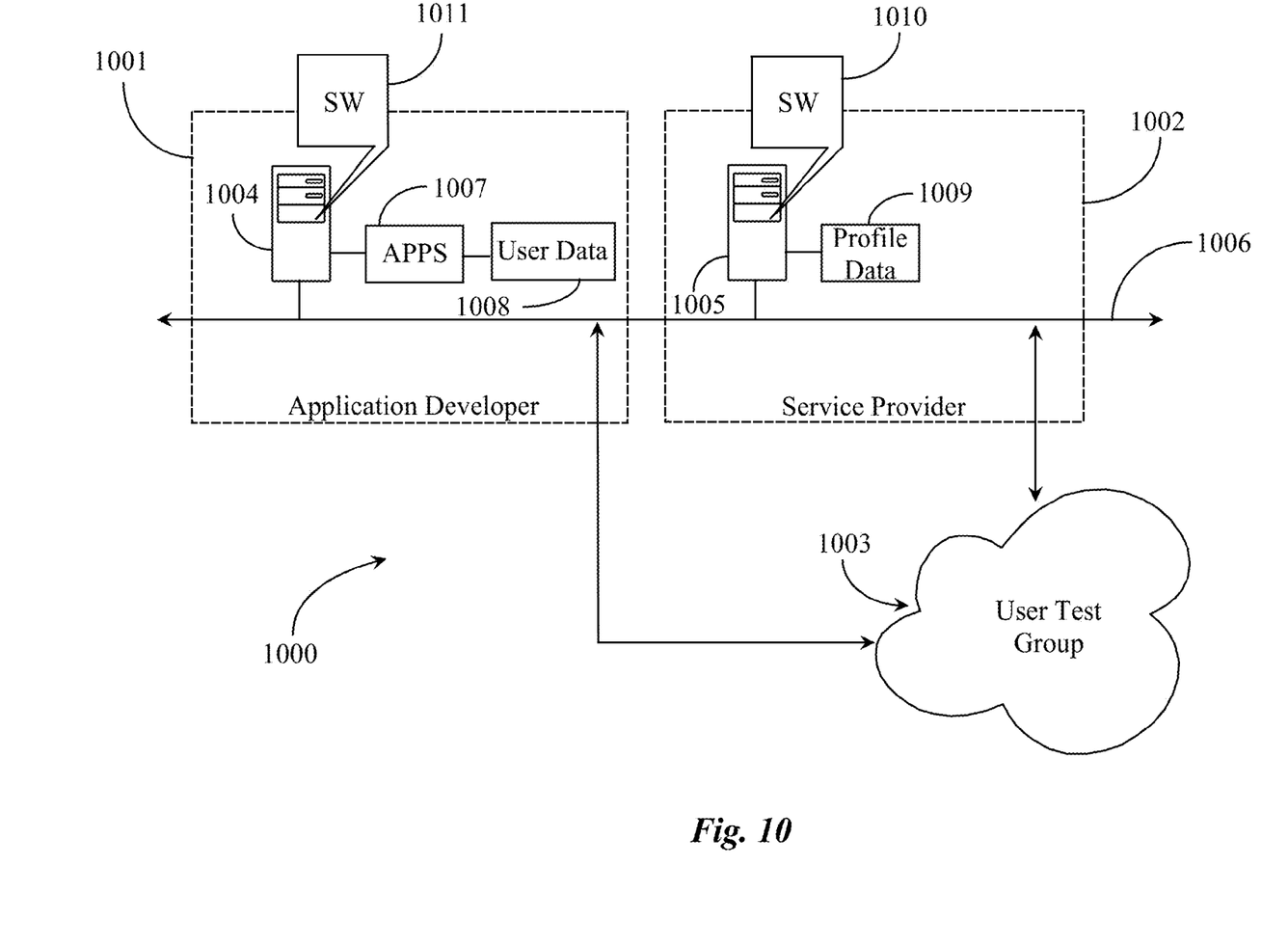
FIG. 10 is a block diagram depicting a commercial relationship between an application developer and a service provider relative to a common user test group.

FIG. 10 is a block diagram 1000 depicting a commercial relationship between an application developer and a service provider connected to a network accessible to a targeted user test group 1003. Diagram 1000 depicts a service provider domain 1002. Service provider domain 1002 represents the network domain of a provider of pre-caching software and services. Service provider domain 1002 includes an information server 1005 having connection to a network backbone 1006. Network backbone 1006 may represent a wide area network such as the Internet network.

Server 1005 includes a processor, a data repository and a memory containing thereon all the data and instruction required to provide the function of information server. Server 1005 has connection to a data repository 1009 containing data relative to common data storage profiles generated by the service provider from data mined from user test group 1003 while interacting with applications served to the group. A common storage profile for an application represents a list of the "most called" data during sessions with an application and the multiple users in the testing group.

In this embodiment an application developer domain 1001 is depicted. Application developer domain 1001 may represent a provider of video gaming services for example. Domain 1001 includes an application server 1004. Application server 1004 includes a processor and a data repository and a memory containing thereon all the data and instruction required to enable the function of application server. Server 1004 has connection to a data repository 1007 containing applications (APPS) such as new video games in the case of a video gaming service. User test group 1003 may represent video gamers registered with a service provided by the entity that is hosting domain 1001. In this sense the video game provider and the pre-caching service provider hosting domains 1001 and domain 1002 are partners.

Server 1005 in domain 1002 hosts software (SW) 1010. SW 1010 may include previously described functionality as well as functionality of processing raw activity data gathered from multiple users testing an application in test group 1003. The application or applications may be made accessible to users of group 1003 through server 1004. In one embodiment, SW 1010 may include a distributable application program interface (API) that may be installed in a SW development application or kit used by an application developer and that may provide an executable monitoring or data reporting link embedded in the application, the link reporting to server 1005 such that when a user in group 1003 executes a target game the monitoring or reporting link opens a connection to server 1005 for real time monitoring or periodic reporting of user activity data contained within the sessions conducted by each user relative to an application (game).

Server 1004 in domain 1001 hosts SW 1011. SW 1011 may be the distributable application program interface (API) described immediately above. SW 1011 may be downloaded from server 1005 to server 1004 or to a network-connected developer's personal computing appliance (not depicted). As users play games, the activity data relative to which application data is called by the application is made available to server 1005 aided by SW 1010. The activity data may be processed in aggregate by SW 1010 to determine the most common data called by the application relative to multiple sessions conducted by the different users. That data profile represents a "common data profile" for the application. The profile data may be stored in repository 1009.

It is noted herein that the process of creating common data-call profiles for applications may be accomplished without co-branding with third-party developers. For example, a sales force application used by multiple salesmen in a single call center or other sales department may be tested and have a common data profile generated and associated with the application. The common profile does not include any addressing of data. The common profile is used to find data stored for the application a user's computing appliance and then generating a list that includes the LBAs for the data on the user's storage device.

In one embodiment the common data profiles generated for applications are provided to the game developer for integration into their games that are available for play. SW 1011 in domain 1001 may also include a version of the caching SW including the filter driver. Users in general may register for pre-caching services through domain 1002 such services including a download of a client application with the filter driver and then interact with applications provided by third parties cooperating with the service and whose applications come with a common data profile that the client application may convert to a custom data storage profile for pre-caching purposes.

In another embodiment, clients of the gaming service that play new games may be offered a SW download that enables the pre-caching processes on those users' computing appliances with respect to the games served to those users. In this case a link may be made available to a directory providing access to other participating software providers. In one embodiment a common data profile for an application is provided only on installation of the application on a client's appliance and is mapped through data matching to the local block addresses (LBAs) on that client's storage device to generate a custom data storage profile for the application. The caching SW downloaded with the application or separately may preload the cache for that application before first launch of the application.

Over time, repeated use of the application may help streamline the pre-caching process further by amending (adding/subtracting) the custom list of LBAs according to emerging patterns of actual data called by the application. An emerging pattern might be repetitive calling of an LBA data block from persistent storage that is not on the custom LBA list. After a certain threshold, the LBA data block may be added to the custom list. Similarly an LBA data block listed in the custom list that is not called or is no longer needed may be removed from the custom list. The pre-caching SW uses the list every time the application is launched and manages preloading of the cache space reserved for that application during interaction with the application.

It will be apparent to one with skill in that art of application development that video games and other media rich interactive applications represent just one type of software application that may be configured for pre-caching. There are many other examples of applications that may be adapted for cache space reservation and pre-caching. Other types of applications that may be adapted for pre-caching include word processing applications, visual design applications, Web design and presentation applications, quality control applications, sales management applications, transactional databases, and so on.

In one embodiment of the present invention the pre-caching SW may also take instruction from a user-populated template or other form of instruction (from system or user) that specifies a priority scheme for multiple stored applications that are enabled for pre-caching. For example a user might have five applications on a computing appliance enabled for pre-caching. Such applications may be used separately on the appliance (shutting one down before opening another) or they may be run in tandem with one another (multiple applications open).

While cache memory may be reserved for all five applications, the pre-caching software may decide by assigned application priority and the available amount of total reserved cache space in cache memory, which of the running applications, pre-caching will be reserved for and which of the running applications will not have pre-caching available for a session or more. In this way the most critical of a user's running applications are optimized for pre-caching while less important applications may wait until the user is no longer operating the more critical applications. Of course cache memory size and application density plays a role in what can be effectively accomplished on a unique computing appliance. The system of the invention is scalable to include powerful computing systems that may run multiple applications simultaneously.

SW 104 may include a user interface as previously described in this specification. The user interface may contain a setting for a user to group applications for pre-caching by priority. In one embodiment information about a user such as application launch activity of the user during a pre-specified period of time may be used to determine automatic priority settings for a group of applications enabled for pre-caching. For example, a user at work may use a particular application more in the beginning of the week (Mon thru Wed) while another application may be used more often later in the week (Wed thru Fri).

The system may automatically prioritize the first application over the other application on Mon thru Wed and it may prioritize the other application over the first one from Wed to Fri. A user may specify this in upfront configuration of applications slated for pre-caching or the system may "learn it" through repeated application use on the appliance. The system may purge data collected or aggregated for determining custom profile adjustments for an application and data retained or aggregated for determining application priority for pre-caching after that data is no longer needed by the system.

In one embodiment pre-caching is provided for a computing appliance that may be shared by multiple users. In this case, the users may have to log-into the system so that their own custom application data profile is followed for pre-caching the applications accessible to that user under after logging in.

It will be apparent to a skilled person that the embodiments described in enabling detail above are exemplary only, and do not describe every way the present invention may be implemented and practiced. SW may be implemented in different ways in different circumstances to accomplish the same or very similar results. There are also many different ways that computer systems may be implemented that might use the SW according to embodiments of the present invention. The invention is limited only by the claims that follow.

The invention claimed is:

1. A system comprising:
a first computerized appliance having connection to a network, a processor, at least one persistent memory data repository coupled thereto, a dynamic random access memory (DRAM), and software (SW) executing on the processor from a non-transitory medium, the SW providing a process:
installing an application for which data caching is desired, storing data to be used in execution of the application at available persistent storage block addresses;
mapping logical block addresses at which particular data is stored to data in an order of expected use according to a data-use profile accessible to the installation process, the data-use profile listing an expected order of data use in execution of the application;
configuring the DRAM with a cache of a specific data capacity;
transferring a block of data equal to the cache size into the cache according to the order of data in the data-use profile; and
as data is used in execution of the application, emptying used data from the cache and transferring not-yet-used data from persistent storage into the cache according to the order of data in the data-use profile.

2. The system of claim 1 wherein data transfer into the cache is block-by-block in the order of the data-use profile as used data is evicted from the cache.

3. The system of claim 1 wherein data transfer into the cache is periodic and determined by pre-determined time or data size.

4. The system of claim 1 wherein data called in execution that is not found in the cache is read from persistent storage.

5. The system of claim 1 wherein actual data use in execution of the application is tracked and compared to the data-use profile, and wherein periodic correction to the data-use profile is made accordingly.

6. The system of claim 1 wherein the data use profile is developed by tracking data use by one or more computerized appliances in execution of the application.

7. The system of claim 6 wherein the data-use profile is developed in cooperation with a vendor of the application.

8. A method comprising:
installing an application for which data caching is desired in persistent memory of a first computerized appliance having connection to a network, a processor, at least one persistent memory data repository coupled thereto, a dynamic random access memory (DRAM), and software (SW) executing on the processor from a non-transitory medium, storing data to be used in execution of the application at available persistent storage block addresses;
mapping logical block addresses at which particular data is stored to data in an order of expected use according to a data-use profile accessible to the installation process, the data-use profile listing an expected order of data use in execution of the application;
configuring the DRAM with a cache of a specific data capacity;
transferring a block of data equal to the cache size into the cache according to the order of data in the data-use profile; and
as data is used in execution of the application, emptying used data from the cache and transferring not-yet-used data from persistent storage into the cache according to the order of data in the data-use profile.

9. The method of claim 8 wherein data transfer into the cache is block-by-block in the order of the data-use profile as used data is evicted from the cache.

10. The method of claim 8 wherein data transfer into the cache is periodic and determined by pre-determined time or data size.

11. The method of claim 8 wherein data called in execution that is not found in the cache is read from persistent storage.

12. The method of claim 8 wherein actual data use in execution of the application is tracked and compared to the data-use profile, and wherein periodic correction to the data-use profile is made accordingly.

13. The method of claim 8 wherein the data use profile is developed by tracking data use by one or more computerized appliances in execution of the application.

14. The method of claim 13 wherein the data-use profile is developed in cooperation with a vendor of the application.

* * * * *